US 6,750,994 B1

(12) United States Patent
Yamamoto

(10) Patent No.: US 6,750,994 B1
(45) Date of Patent: Jun. 15, 2004

(54) EXPOSURE CONTROL DEVICE OF IMAGE READING DEVICE

(75) Inventor: Yasuhiro Yamamoto, Tokyo (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 09/379,602

(22) Filed: Aug. 24, 1999

(30) Foreign Application Priority Data

Aug. 26, 1998 (JP) .......................................... P10-240711

(51) Int. Cl.$^7$ ................................................. G03F 3/08
(52) U.S. Cl. ........................ 358/522; 382/167; 382/168; 382/169; 358/3.01; 358/522
(58) Field of Search ..................... 358/522, 3.01–3.23, 358/504, 506, 505; 382/168, 169, 170, 171, 172, 167; 348/362, 363, 364, 365, 109, 111

(56) References Cited

U.S. PATENT DOCUMENTS

| 4,843,474 A | * | 6/1989 | Suzuki | 348/230.1 |
| 5,517,242 A | * | 5/1996 | Yamada et al. | 348/254 |
| 5,751,401 A | * | 5/1998 | Takaoka et al. | 355/32 |
| 5,850,297 A | * | 12/1998 | Honda | 358/474 |
| 5,929,908 A | * | 7/1999 | Takahashi et al. | 348/364 |
| 6,014,234 A | * | 1/2000 | Yamamoto | 358/522 |
| 6,208,749 B1 | * | 3/2001 | Gutkowicz-Krusin et al. | 382/128 |
| 6,212,293 B1 | * | 4/2001 | Yamamoto | 382/168 |
| 6,462,835 B1 | * | 10/2002 | Loushin et al. | 358/1.9 |

* cited by examiner

Primary Examiner—Kimberly Williams
Assistant Examiner—Melanie Vida
(74) Attorney, Agent, or Firm—Greenblum & Bernstein, P.L.C.

(57) ABSTRACT

The exposure control device has a line sensor sensing image data corresponding to a color image recorded in a negative film. The line sensor is exposed using first, second and third exposure times so that image data are obtained for each of the exposure times. Histograms, representing a distribution of pixel values of the each of image data, are generated for each of the exposure times. Regarding each of the histograms, maximum effective values are obtained. A first histogram, in which the maximum effective value is the greatest, is selected. The optimum exposure time is calculated, based on the maximum effective value (Hr2D) of the first histogram and the maximum effective value (Hr1D) of the second histogram which corresponds to image data, obtained by an exposure time which is subsequently shorter than the exposure time of the first histogram.

10 Claims, 14 Drawing Sheets

EXPOSURE CONTROL DEVICE OF IMAGE READING DEVICE

BACKGROUND OF THE INVENTION

1. Field of the Invention

The present invention relates to an image reading device which reads a color image recorded in a negative film by using an optical sensor.

2. Description of the Related Art

Conventionally, in the image reading device, an exposure measurement is performed, prior to a pre-scanning operation and a regular scanning operation, by which image data, which will be output to a personal computer, are sensed, so that an optimum exposure time, for which electric charges are accumulated in a line sensor in the pre-scanning operation and the regular scanning operation, is calculated. In the exposure measurement, the image is scanned with a pitch coarser than that of the regular scanning operation, and the image data are sensed by an operation in which the line sensor is exposed with a relatively short exposure time. The optimum exposure time is obtained by analyzing the image data. The analysis of the image data is carried out based on a histogram indicating a distribution of pixel values contained in the image data.

Then, a scanning operation is performed again with a coarser pitch, using the optimum exposure time, so that exposure parameters are calculated based on the image data, to carry out a color correction of the color image which is to be indicated by a display device of the personal computer. The exposure parameters are obtained based on a histogram indicating a distribution of pixel values of the image data, similarly to the calculation of the optimum exposure time.

The dynamic range of negative film is broad, and therefore, densities of the recorded film are broadly scattered. Further, output characteristics of the line sensor are non-linear, and thus, the tendency for non-linearity is great especially when the output signal is low. Therefore, if the image data are always sensed with a constant exposure time in the exposure measurement, a problem occurs in which the accuracy of the sensing of exposure parameters is low, because of the non-linearity of the output characteristics of the line sensor, when an object image is dark such that the film density is high.

SUMMARY OF THE INVENTION

Therefore, an object of the present invention is to provide an exposure control device which always obtains the exposure parameters with a high accuracy and in a short time, irrespective of the film density.

According to the present invention, there is provided an exposure control device provided in an image reading device which reads a color image recorded in a negative film, the exposure control device comprising an image reading processor, a histogram generating processor, a histogram selecting processor, and an optimum exposure time calculation processor.

The image reading processor exposes an optical sensor to obtain image data corresponding to the color image, using more than two kinds of exposure times, which are different from each other. The image data are generated regarding the exposure times, respectively. The histogram generating processor generates histograms showing distributions of pixel values of the image data, regarding each of the exposure times. The histogram selecting processor obtains a maximum effective value in each of the histograms, and selects a first histogram, in which the maximum effective value is less than or equal to a predetermined value and is the greatest value among the histograms, and a second histogram corresponding to the image data obtained by using one of the exposure times which is subsequently shorter than the exposure time of the first histogram. The optimum exposure time calculation processor calculates an optimum exposure time based on the maximum effective values of the first and second histograms.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

Figure 1:
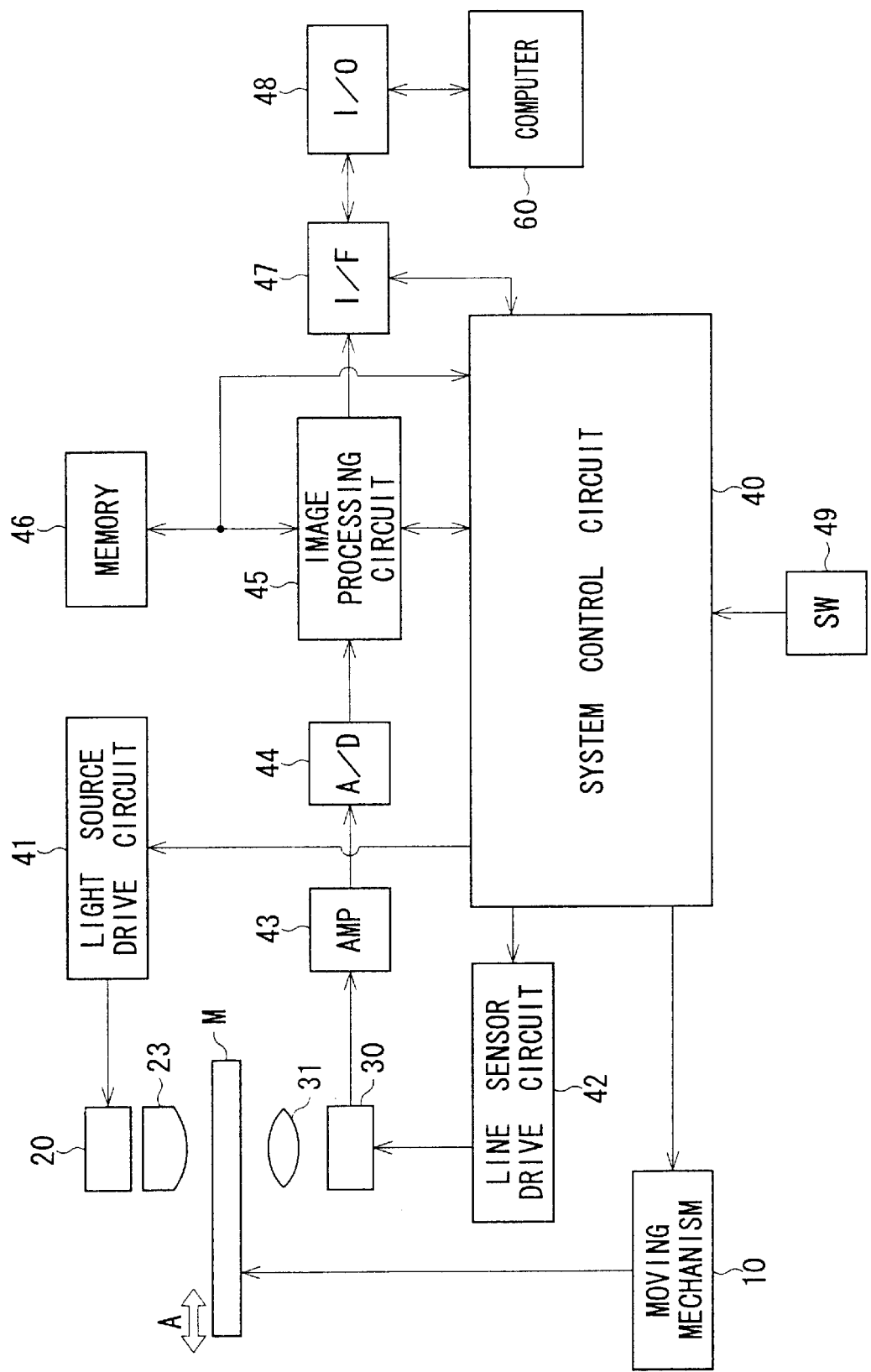
FIG. 1 is a block diagram showing an image reading device having an exposure control device of an embodiment of the present invention.

The present invention will be described below with reference to embodiments shown in the drawings.

FIG. 1 shows an electrical structure of an image reading device having an exposure control device of an embodiment of the present invention.

A read object M, handled by this image reading device, is a transparent negative film on which a color image has been recorded. The film M is intermittently moved, by a moving mechanism 10, in a direction shown by an arrow A.

A light source 20 and a cylindrical lens 23, provided below the light source 20, are disposed above a path along which the film M is moved. A line sensor 30 and a forming lens 31, provided above the line sensor 30, are disposed under the path. The light source 20 is connected to a light source drive circuit 41, so that the light source 20 can be turned ON and OFF. The line sensor 30 is connected to a line sensor drive circuit 42, so that the color image can be read by the line sensor 30. The moving mechanism 10, the light source drive circuit 41 and the line sensor drive circuit 42 are controlled in accordance with a command signal which is output by a system control circuit 40.

The line sensor 30 is provided with a plurality of photodiodes, which are aligned rectilinearly, whereby an electric signal, corresponding to the amount of light received by the photo-diode, is generated in each of the photo-diodes. The electric signal (i.e. the image data), read through the line sensor 30, is amplified by an amplifier 43 and is converted to a digital signal by an A/D converter 44. The digital image data are subjected to an image process, such as a shading correction, in an image processing circuit 45, and are then stored in a memory 46.

The image data, subsequent to be read from the memory 46, are subjected to calculation processes, such as, for example, a color correction and a gamma correction, in the image processing circuit 45. Then, an interface circuit 47 converts the image data to a predetermined format for output to an external computer 60 via an input/output terminal 48. The image processing circuit 45 and the interface circuit 47 are controlled by the system control circuit 40.

In this embodiment, although all of the operations can be controlled by the external computer 60, a switch 49 may be connected to the system control circuit 40, so that various operations can be performed, such as reading the image recorded on the read object M, for example.

Figure 2:
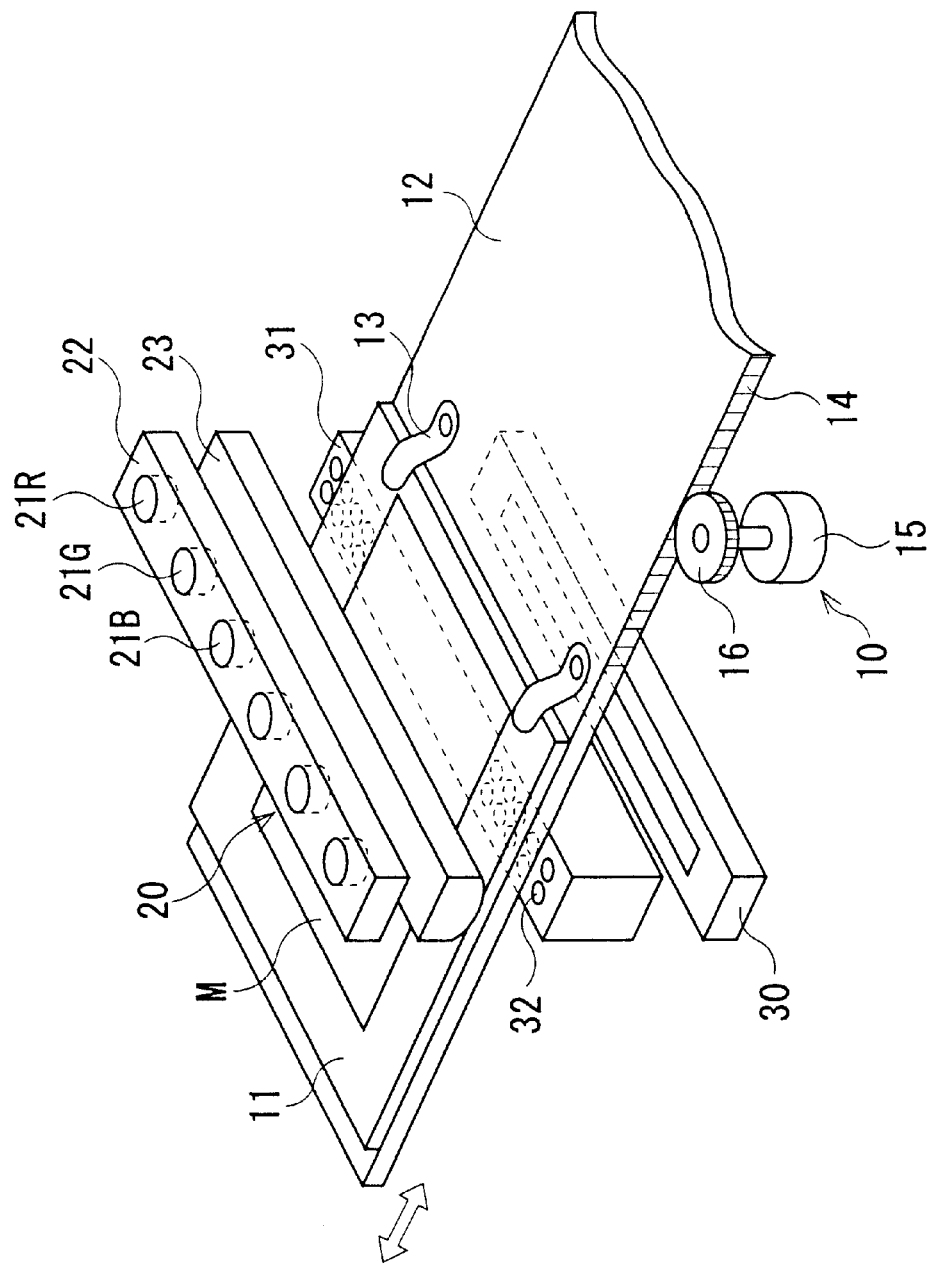
FIG. 2 is a perspective view showing a moving mechanism, a light source and a line sensor.

FIG. 2 shows the moving mechanism 10, the light source 20 and the line sensor 30. The negative film M is supported by a frame 11, which is fixed on a plate stage 12 by a fastener 13. An opening (not shown) is formed in the stage 12 at a position corresponding to the film M, so that a light beam radiated onto the film M can pass through the film M. A rack 14 is formed on a side surface of the stage 12. A pinion 16 fixed on an output shaft of a feeding motor 15 is meshed with the rack 14. The feeding motor 15, which is a stepping motor, for example, is driven under control of the system control circuit 40, so that the position of the read object M is controlled.

The light source 20, positioned above the stage 12, is provided with light-emitting diodes 21R, 21G and 21B, which radiate R(red), G(green) and B(blue) light beams, respectively. Note that, although only six light-emitting diodes are shown in FIG. 2, further light-emitting diodes may be provided. The light-emitting diodes 21R, 21G and 21B, supported by a slender support member 22, which extends in a breadth direction of the stage 12, are arranged in this order uniformly along the support member 22. The cylindrical lens 23, positioned between the support member 22 and the stage 12, is extended in parallel with the support member 22. Namely, light emitted by the light-emitting diodes 21R, 21G and 21B is condensed in a direction in which the stage 12 is moved, by the cylindrical lens 23, so that a line-shaped light beam is radiated onto the film M.

The line sensor 30 is positioned under the light source 20, leaving a space therebetween, such that the stage 12 can be interposed between the light source 20 and the line sensor 30. The line sensor 30, the light source 20 and the cylindrical lens 23 are parallel to each other. Namely, the line sensor 30 extends in a direction approximately perpendicular to a direction in which the film M is moved. The forming lens 31 is provided between the line sensor 30 and the stage 12. The forming lens 31, composed of a rod lens array 32, extends parallel to the line sensor 30. Accordingly, when a light beam is emitted onto the film M, by the light source 20, the image recorded in the film M is formed on the light receiving surface of the line sensor 30, through the forming lens 31.

Figure 3:
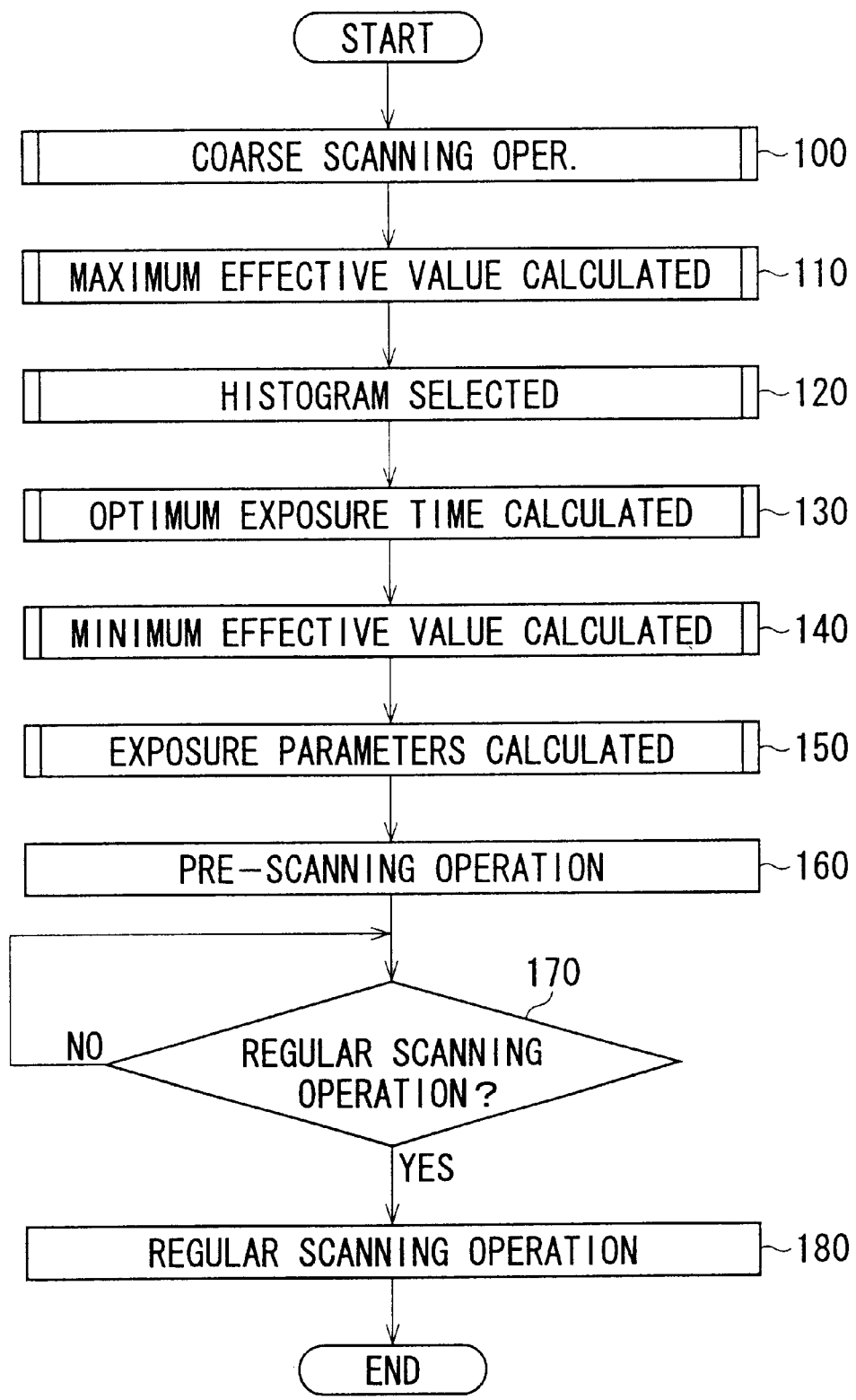
FIG. 3 is a flowchart of an image reading routine executed in the image reading device.

FIG. 3 is a flowchart of an image reading routine executed in the image reading device.

In Step 100, a coarse scanning operation is executed, in which the film M is intermittently moved by the moving mechanism 10, with a pitch coarser than that of a regular scanning operation which is executed in Step 180. In the intermittent movement, the light-emitting diodes 21R, 21G and 21B are turned ON in a predetermined order every time the film M is stopped, so that R, G and B image data of the color image recorded in the film M are sensed by the line sensor 30.

Three differing lengths, of exposure times of the line sensor 30, are set for each of the R, G and B image data, respectively. Regarding the R component, a first exposure time Tr1, a second exposure time Tr2 and a third exposure time Tr3 are set. The second exposure time Tr2 is double the first exposure time Tr1, and the third exposure time Tr3 is four times the first exposure times Tr1. Also in the G image data, a second exposure time Tg2 is double a first exposure time Tg1, and a third exposure time Tg3 is four times the first exposure times Tg1. Similarly, in the B image data, a second exposure time Tb2 is double a first exposure time Tb1, and a third exposure time Tb3 is four times the first exposure times Tb1.

Figure 4:
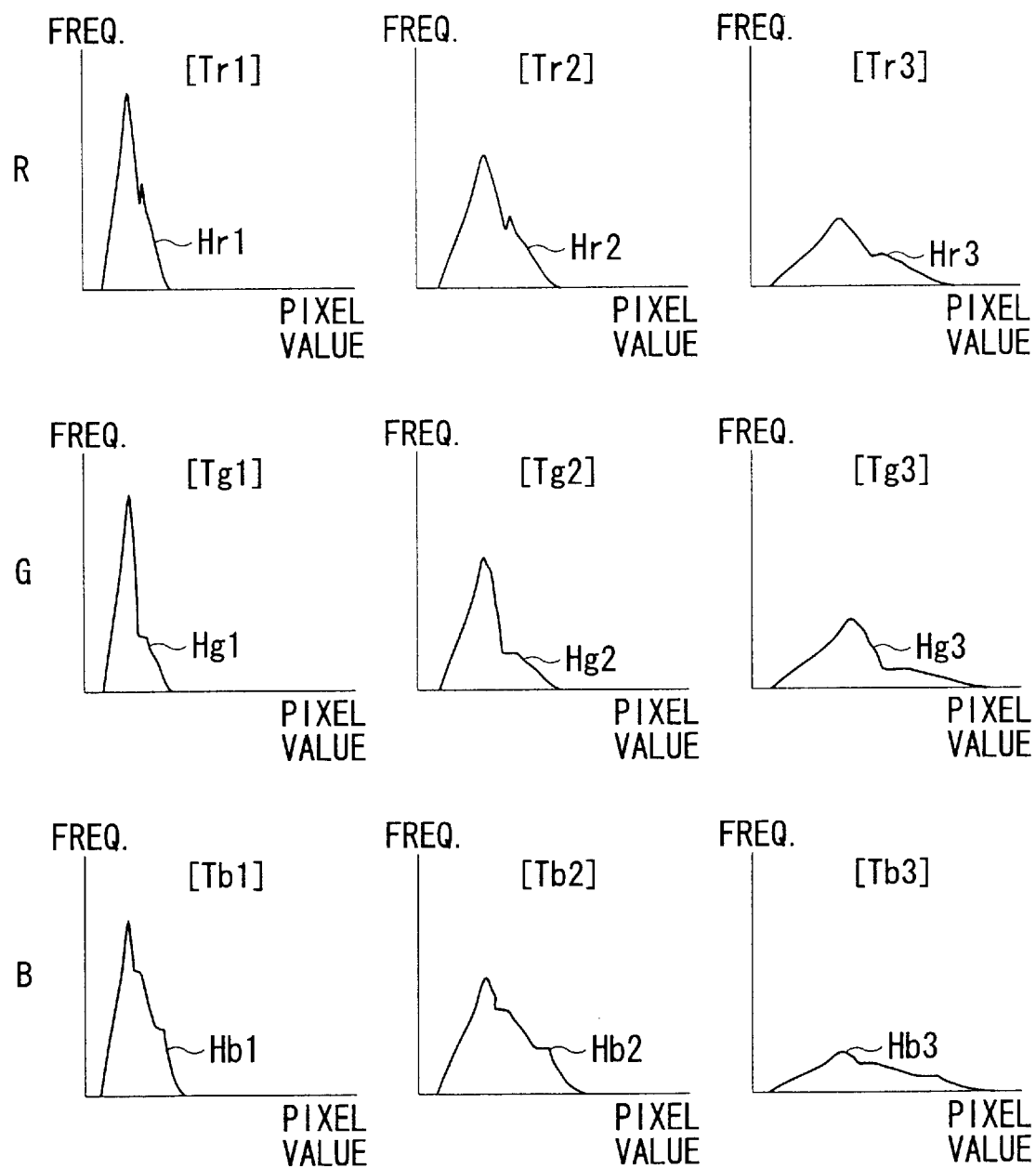
FIG. 4 is a histogram indicating a distribution of pixel values obtained by a line sensor.

Regarding the nine kinds of image data sensed as described above, a histogram representing the distribution of pixel values is obtained, respectively. Namely, as shown in FIG. 4, histograms Hr1, Hr2, Hr3, Hg1, Hg2, Hg3, Hb1, Hb2 and Hb3, which correspond to first, second and third exposure times Tr1, Tr2, Tr3, Tg1, Tg2, Tg3, Tb1, Tb2 and Tb3, are obtained for R, G and B components. In each of the histograms shown in FIG. 4, the abscissa indicates a level of the pixel value and the ordinate indicates a frequency of occurrence of the pixel value. Note that the coarse scanning operation and the generation of the histograms will be described later with reference to FIGS. 5A and 5B.

Then, in Steps 110 through 150, a process, by which exposure parameters are calculated, is performed. The image data read from the negative film M are then subjected to a negative/positive conversion. At this time, since the ground color of the film M is a chromatic color, a color correction should be performed, and therefore, the exposure parameters are used for performing the color correction when the image data are subjected to the negative/positive conversion.

In Step 110, regarding the histogram generated for each of the R, G and B components, a maximum effective value, which is less than the maximum pixel value by a predetermined amount, is obtained. Namely, the maximum effective value is the pixel value which is obtained by integrating the frequency of occurrences of pixel values from the maximum pixel value until the integrating value reaches 1%, for example, of the whole number of the pixels which are obtained in Step 100.

In Step 120, a histogram, in which the maximum effective value is less than or equal to a predetermined value and is the greatest value among the histograms, is selected for each of the R, G and B components. When the image data is represented by 10 bit (i.e., 0–1023), the predetermined value is 900, for example. Namely, in Step 120, the histogram, in which the maximum effective value is the greatest within a range in which the image data do not become saturated, is selected for each of the R, G and B components, as a first histogram. Further, in Step 120, regarding each of the color components, a second histogram, corresponding to the image data obtained by using the exposure times which is subsequently shorter than the exposure time of the first histogram, is selected. For example, regarding the R component, when the histogram Hr2 is selected as the first histogram, the histogram Hr1 is selected as the second histogram.

In Step 130, for each of the R, G, and B components, an optimum exposure time, which is an exposure time for obtaining an optimum contrast, is calculated based on the maximum effective values of the first and second histograms.

In Step 140, in a similar way to Step 110, regarding the histogram of each of the R, G and B components, a minimum effective value, which is greater than the minimum pixel value by a predetermined amount, is obtained.

Then, in Step 150, the exposure parameters are calculated using the maximum effective value and the minimum effective value, for each of the R, G and B components. Note that the obtaining of the maximum effective value and the minimum effective value will be described later.

In Step 160, a pre-scanning operation is performed. The reading pitch of the pre-scanning operation is finer than that of the coarse scanning operation, but coarser than that of the regular scanning operation. In the pre-scanning operation, for each of the R, G and B components, the image data are detected by the line sensor 30 with the optimum exposure time. The image data are then converted into digital pixel data by the A/D convertor 44.

The digital image data of each of the color components are subjected to the color correction and the negative/positive conversion, using the exposure parameters which are obtained in Step 150, in the image processing circuit 45, so that normalized image data are obtained. The normalized image data are subjected to a gamma correction, and then output to a display device of the computer 60, which is provided outside the image reading device, through the input/output terminal 48, so that a color image is indicated on a surface of the display device of the computer 60.

In Step 170, it is determined whether the regular scanning operation is to be started. The user can determine whether the regular scanning operation is to be started by observing the image indicated on the surface of the display device of the computer 60. By clicking a button on a mouse, incorporated as part of the computer 60, for example, for starting the regular scanning operation, the process goes from Step 170 to Step 180, in which the regular scanning operation is performed. While the button on the mouse is not clicked, i.e. while the regular scanning operation is not to be performed, Step 170 is repeatedly executed. During the execution of Step 170, an error process can be performed by the user to adjust the various settings of the regular scanning operation, and a pre-scanning operation may be carried out.

In Step 180, the regular scanning operation is performed, in which the image recorded on the film M is read with a predetermined fine pitch, so that the image data are detected and converted into digital image data, similarly to the pre-scanning operation. The digital image data are subjected to the color correction and the negative/positive conversion, so that the image data are converted into the normalized image data. By referring to a look-up table (LUT), which is stored in the memory 46, for example, the normalized image data are converted into preset values so that the normalized image data are subjected to a gamma correction. The data, which have been subjected to the gamma correction, are outputted to the display device of the computer 60 through the interface circuit 47 and the input/output terminal 48, and this program ends.

Figure 5A:
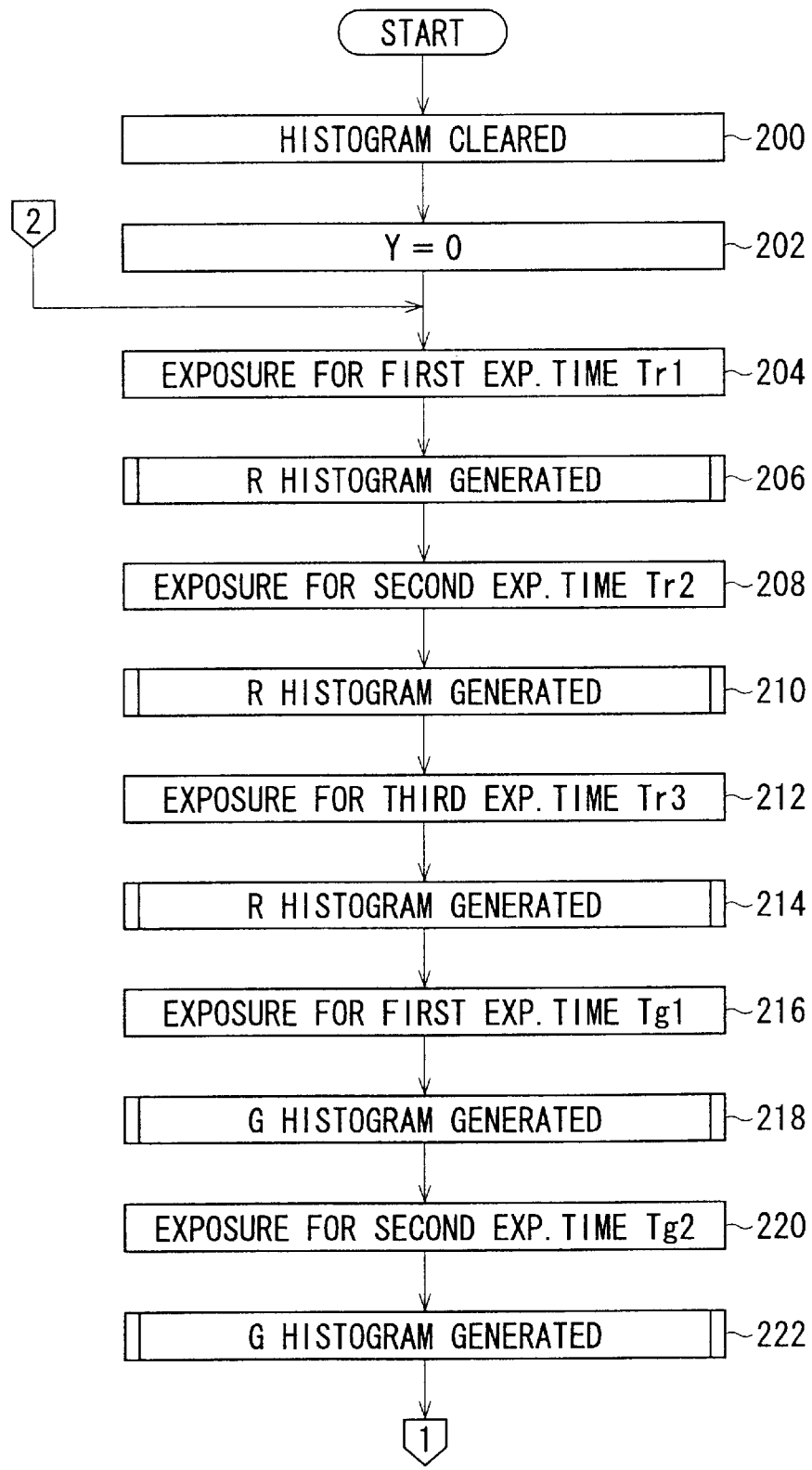
FIGS. 5A and 5B show a flowchart of a subroutine of a coarse scanning operation executed in Step 100 of FIG. 3.
Figure 5B:
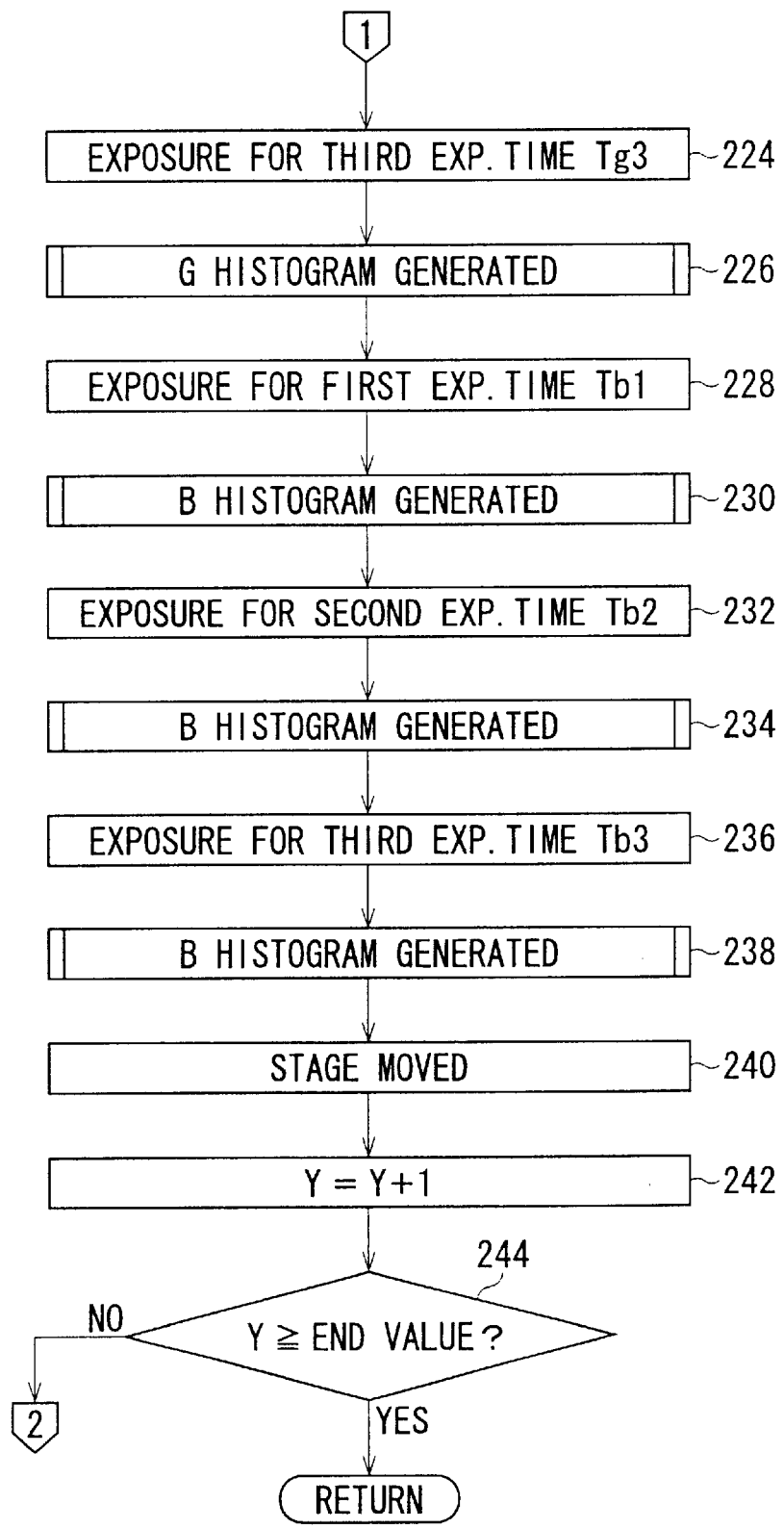

FIGS. 5A and 5B show a flowchart of a subroutine of a coarse scanning operation executed in Step 100 of FIG. 3.

In Step 200, histogram data, which are stored in the memory 46, are cleared. In Step 202, the stage 12 is moved, so that an edge portion of the film M is set to an initial position corresponding to the light source 20, and an initial value of a parameter Y corresponding to the position of the film M is set to "0".

In Step 204, the light-emitting diodes 21R of the light source 20 are turned ON, so that the film M is illuminated. The line sensor 30 is exposed for the first exposure time Tr1, by a red light beam passing through the film M. In Step 206, a single line of red image data is detected by the line sensor 30. The single line of red image data is converted to a single line of digital red image data by the A/D convertor 44, and based on the digital red image data, data forming a histogram Hr1 of the R component is generated.

In Step 208, the line sensor 30 is exposed for the second exposure time Tr2 which is double the first exposure time Tr1, by a red light beam radiated by the light-emitting diodes 21R. In Step 210, a single line of red image data is detected by the line sensor 30, and in a similar way to Step 206, data forming a histogram Hr2 of the R component is generated. In Step 212, the line sensor 30 is exposed for the third exposure time Tr3 which is double the second exposure time Tr2, by a red light beam radiated by the light-emitting diodes 21R. In Step 214, a single line of red image data is detected by the line sensor 30, and in a similar way to Steps 206 and 210, data forming a histogram Hr3 of the R component is generated.

In a similar way to Steps 204 through 214, histograms of the G component are generated in Steps 216 through 226. Namely, in Step 216, the light-emitting diodes 21G of the light source 20 are turned ON, and thus, the line sensor 30 is exposed for the first exposure time Tg1. Then, in Step 218, a single line of green image data is detected by the line sensor 30, and data forming a histogram Hg1 of the G component is generated. In Step 220, the line sensor 30 is exposed for the second exposure time Tg2 by a green light beam radiated by the light-emitting diodes 21G, and in Step 222, data forming a histogram Hg2 of the G component of a single line is generated. In Step 224, the line sensor 30 is exposed for the third exposure time Tg3 by a green light beam radiated by the light-emitting diodes 21G, and in Step 226, data forming a histogram Hg3 of the G component of a single line is generated.

In a similar way to Steps 204 through 214 and 216 through 226, histograms of the B component are generated in Steps 228 through 238. Namely, in Step 228, the light-emitting diodes 21B of the light source 20 are turned ON, and thus, the line sensor 30 is exposed for the first exposure time Tb1, and in Step 230, data forming a histogram Hb1 of the B component of a single line is generated. In Step 232, the line sensor 30 is exposed for the second exposure time Tb2 by a blue light beam radiated by the light-emitting diodes 21B, and in Step 234, data forming a histogram Hb2 of the B component of a single line is generated. In Step 236, the line sensor 30 is exposed for the third exposure time Tb3, by a blue light beam radiated by the light-emitting diodes 21B, and in Step 238, data forming a histogram Hb3 of the B component of a single line is generated.

In Step 240, the stage 12 and the film M are moved by one pitch, and in Step 242, the parameter Y is increased by one. In Step 244, it is determined whether the parameter Y is greater than or equal to the end value (i.e. the number of scanning lines of the coarse scanning operation). When the parameter Y is less than the end value, the processes from Steps 204 through 242 are executed again, so that the histograms are generated for the next line of each of the R, G and B components. When it is determined in Step 244 that the parameter Y is greater than or equal to the end value, the subroutine of the coarse scanning operation ends since each of the histograms for the R, G and B components of one frame image has been completed.

Figure 6:
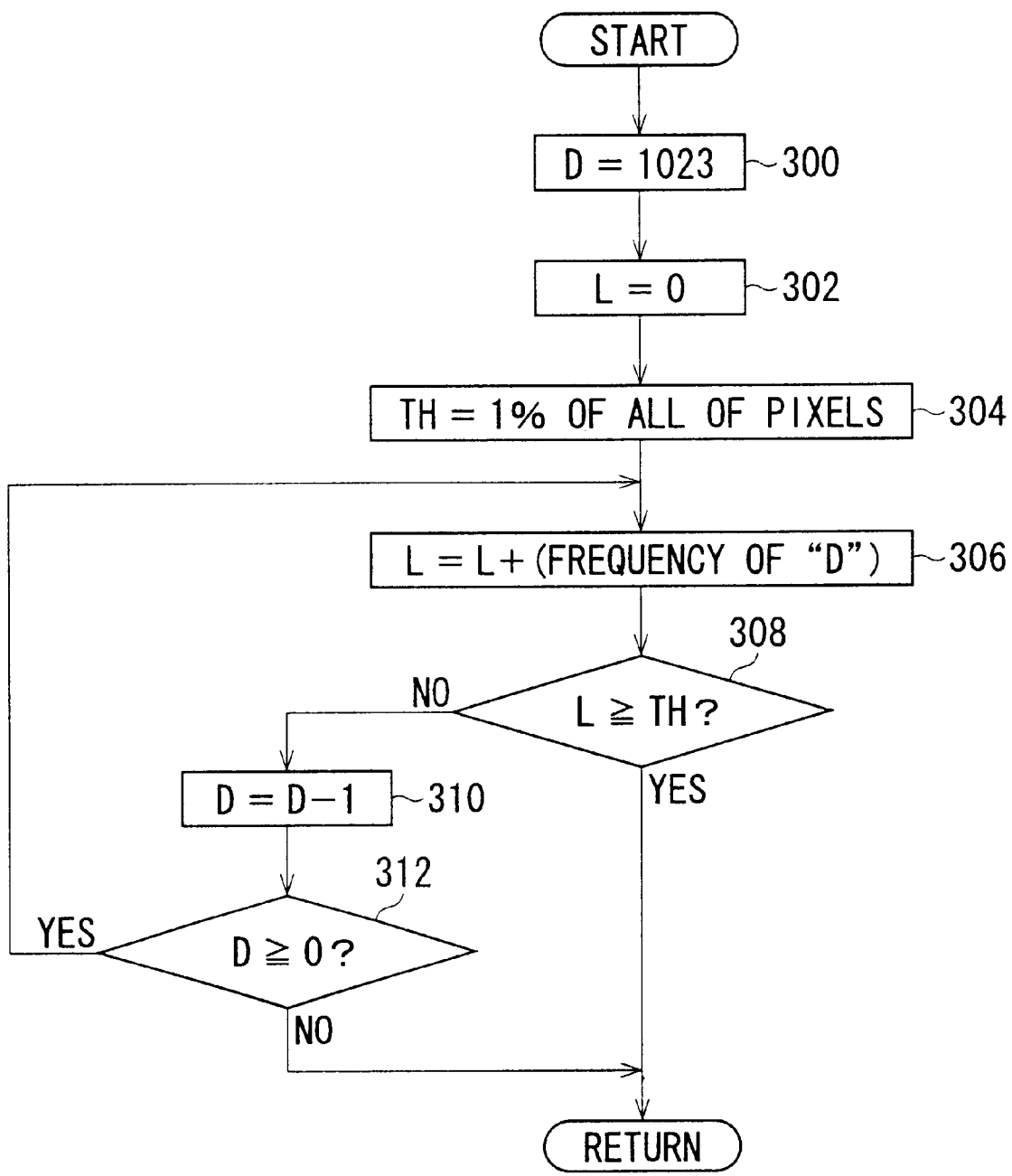
FIG. 6 shows a flowchart of a subroutine, which is executed in Step 110 of FIG. 3, to obtain the maximum effective value.

FIG. 6 shows a flowchart of a subroutine, which is executed in Step 110 of FIG. 3, to obtain the maximum effective value. This subroutine is executed for nine histograms Hr1, Hr2, Hr3, Hg1, Hg2, Hg3, Hb1, Hb2 and Hb3 shown in FIGS. 4.

In Step 300, a pixel value "D" which is the initial value of the maximum effective value, is set to "1023". In Step 302, a total amount "L" of the frequencies is set to an initial value 0. In Step 304, the threshold value TH is set to be 1% of the total number of the digital pixel signals included in one frame. The maximum effective value is determined in accordance with the threshold value TH. Namely, the maximum effective value is the pixel value when the total amount "L" of the frequencies reaches the threshold value TH.

In Step 306, based on a histogram, the total amount "L" of the frequencies is obtained. Namely, the frequency of the pixel value "D" is read from the memory 46, and is added to the total amount "L" of the frequencies which has been obtained so far, so that the total amount "L" of the frequencies from the maximum value "1023" to the pixel value "D" is obtained.

In Step 308, it is determined whether the total amount "L" is greater than or equal to the threshold value TH. When the total amount "L" is less than the threshold value TH, the pixel value "D" is decreased by 1 in Step 310. Then, in Step 312, it is determined whether the pixel value "D" is greater than or equal to 0. When the pixel value "D" is greater than or equal to 0, Step 306 is executed again, so that the total amount "L" of the frequencies, which are from the maximum value 1023 to the pixel value "D", is obtained.

Thus, when it is determined in Step 308 that the total amount "L" is greater than or equal to the threshold value TH, the pixel value "D" is stored in the memory 46 as the maximum effective value, and this routine ends. Conversely, when it is determined in Step 312 that the pixel value "D" is less than 0, i.e., when the total amount "L", which exceeds the threshold value TH, does not exist, this routine ends.

Regarding the maximum effective values obtained as described above, the maximum effective values of the histograms Hr1, Hr2 and Hr3 are referred to as Hr1D, Hr2D and Hr3D, the maximum effective values of the histograms Hg1, Hg2 and Hg3 are referred to as Hg1D, Hg2D and Hg3D, and the maximum effective values of the histograms Hb1, Hb2 and Hb3 are referred to as Hb1D, Hb2D and Hb3D, hereinafter.

Figure 7:
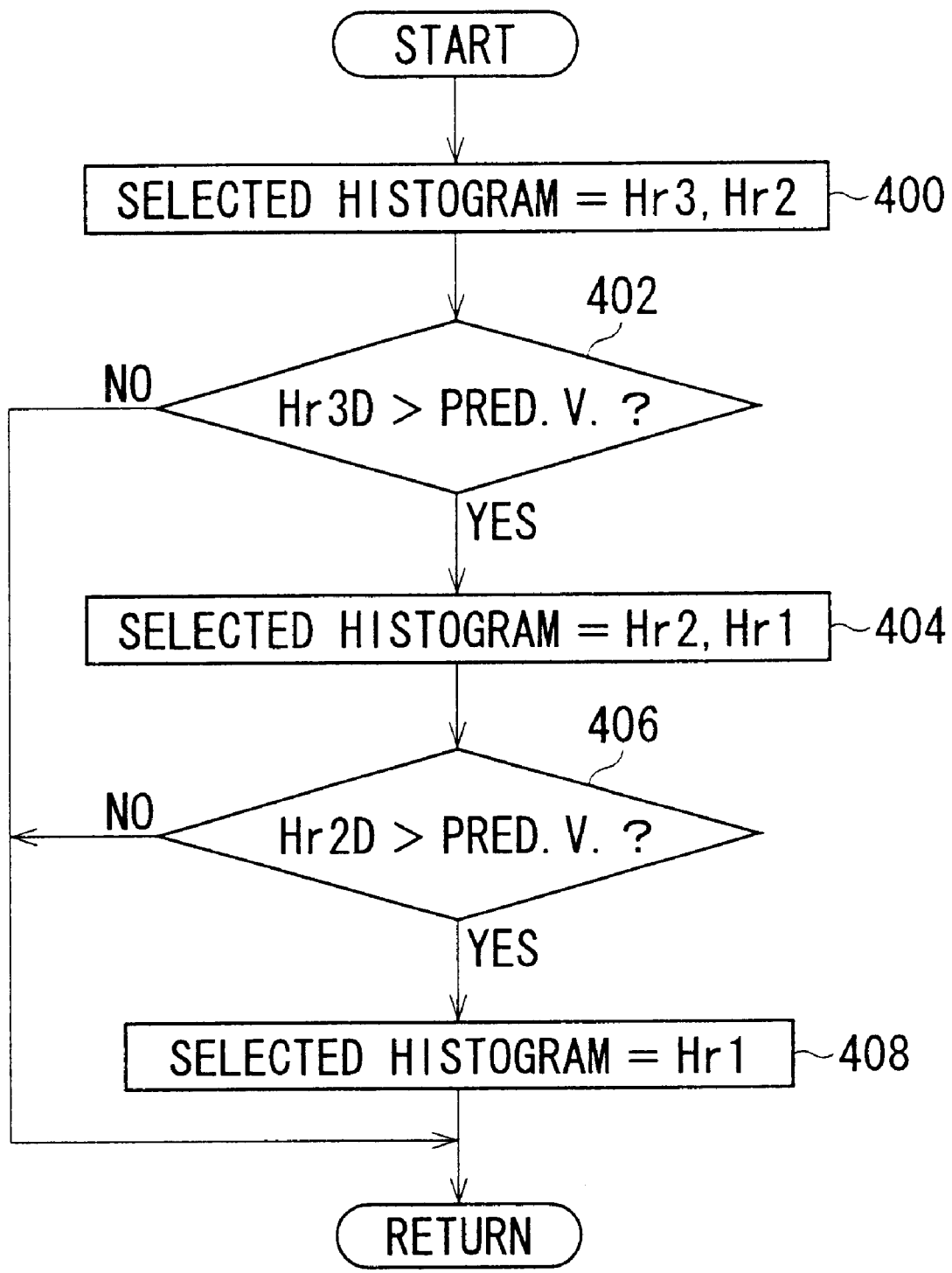
FIG. 7 shows a flowchart of a subroutine, which is executed in Step 120 of FIG. 3, to select histograms of the R component.

FIG. 7 shows a flowchart of a subroutine in which the R histograms are selected in Step 120 of FIG. 3.

In Step 400, the histogram Hr3, obtained using the third exposure time Tr3, and the histogram Hr2, obtained using the second exposure time Tr2, are selected. In Step 402, it is determined whether the maximum effective value Hr3D is greater than a predetermined value. The predetermined value is 900, for example, when pixel values for generating the histogram is indicated by 10 bit. Since the third exposure time Tr3 is the longest among the three exposure times, when the maximum effective value Hr3D is less than or equal to the predetermined value, the histogram Hr3 corresponding to the maximum effective value Hr3D is one in which the maximum effective value is the greatest among histograms in which the image data do not become saturated. Therefore, the histogram Hr3 is selected as the first histogram, the histogram Hr2 is selected as the second histogram, and then this routine ends.

Conversely, when it is determined in Step 402 that the maximum effective value Hr3D is greater than the predetermined value, a part of the image data contained in the histogram Hr3 may become saturated. Accordingly, in this case, Step 404 is executed in which the histogram Hr2, obtained using the second exposure time Tr2, and the histogram Hr1, obtained using the first exposure time Tr1 are selected. Then, Step 406 is executed in which it is determined whether the maximum effective value Hr2D is greater than the predetermined value. When the maximum effective value Hr2D is less than or equal to the predetermined value, the histogram Hr2 corresponding to the maximum effective value Hr2D is one in which the maximum effective value is the greatest among histograms in which the image data do not become saturated. Therefore, in this case, Step 404 is executed in which the histogram Hr2 is selected as the first histogram, the histogram Hr1 is selected as the second histogram, and then this routine ends.

When it is determined in Step 406 that the maximum effective value Hr2D is greater than the predetermined value, a part of the image data contained in the histogram Hr2 may become saturated. Accordingly, in this case, Step 408 is executed in which the histogram Hr1 obtained using the first exposure time Tr1 is selected as the first histogram, and then this subroutine ends. The second histogram is not selected. Note that the first exposure time Tr1 is set to be short enough such that the sensed image data cannot become saturated.

Regarding the G and B components, similarly to the R component, a histogram, in which the maximum effective value is less than or equal to a predetermined value and is the greatest among the histograms, is selected.

Figure 8:
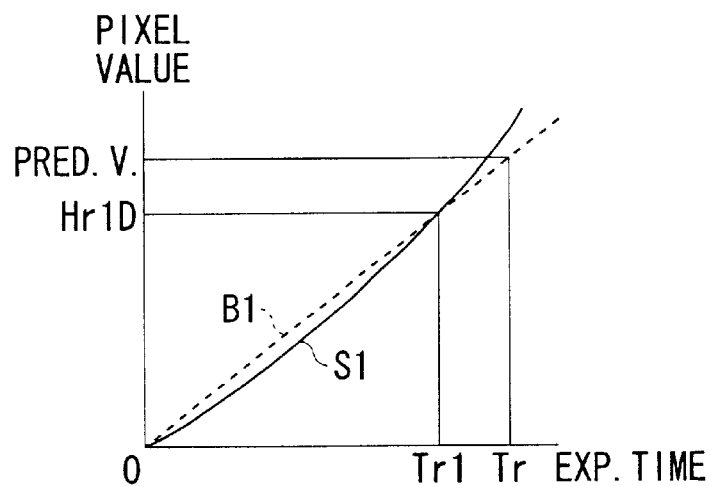
FIG. 8 shows an example of a relationship between the exposure time and the pixel values when the histogram Hr1 is selected in Step 120 of FIG. 3.
Figure 9:
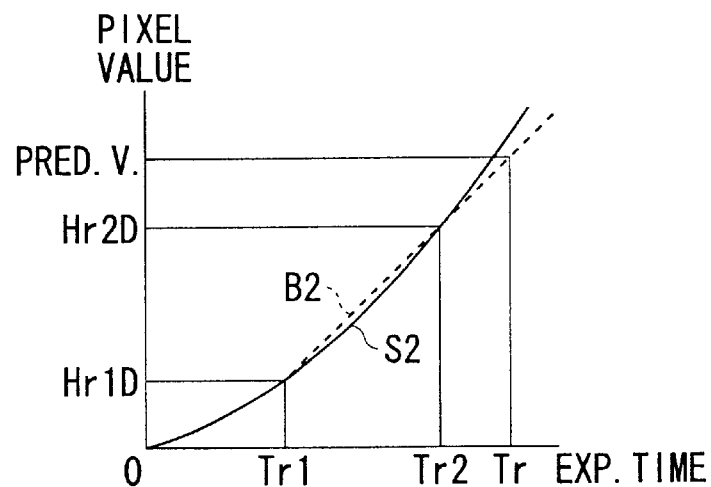
FIG. 9 shows an example of a relationship between the exposure time and the pixel values when the histograms Hr1 and Hr2 are selected in Step 120 of FIG. 3.

With reference to FIGS. 8 and 9, a calculation of the optimum exposure time performed in Step 130 of FIG. 3 is described below. FIGS. 8 and 9 are graphs in which the abscissa indicates an exposure time to the line sensor 30 and the ordinate indicates an output signal (i.e., a pixel value) of the line sensor 30. A pixel value sensed by the line sensor 30 is changed in accordance with the exposure time, as shown by solid lines S1 and S2. Namely, a relationship between the exposure time and the pixel values is not completely linear, but shows a non-linearity especially in a portion in which the exposure time is short.

FIG. 8 shows an example of a relationship between the exposure time and the pixel values when the histogram Hr1 is selected in Step 120 of FIG. 3. Although the relationship S1 between the exposure time and the pixel value is non-linear, the optimum exposure time Tr is obtained by deeming that the relationship is linear as shown by a broken line B1. Namely, it is deemed that a ratio of the optimum exposure time Tr to the exposure time Tr1 when obtaining the histogram Hr1 is equal to a ratio of a predetermined value (e.g., 900) to the maximum effective value Hr1D, and thus, the optimum exposure time Tr is obtained according to formula (1):

$$Tr=(PV/Hr1D) \times Tr1 \quad (1)$$

wherein PV is the predetermined value.

FIG. 9 shows an example of a relationship between the exposure time and the pixel values when the histograms Hr1 and Hr2 are selected in Step 120 of FIG. 3. In this case, regarding the histogram Hr2 and the histogram Hr1 which is obtained with the exposure time subsequently shorter than the exposure time of the histogram Hr2, the optimum exposure time Tr is obtained by deeming that the exposure time and the pixel values have the linear relationship shown by a broken line B2. Namely, the optimum exposure time Tr is obtained according to formula (2):

$$Tr=\{(PV-Hr1D) \times (Tr2-Tr1)\}/(Hr2D-Hr1D)+Tr1 \quad (2)$$

Similarly, when the histogram Hr3 is selected, the optimum exposure time Tr is calculated according to formula (3):

$$Tr=\{(PV-Hr2D) \times (Tr3-Tr2)\}/(Hr3D-Hr2D)+Tr2 \quad (3)$$

Regarding the G and B components, in a similar way to the R component, the optimum exposure times Tg and Tb are calculated.

Figure 10:
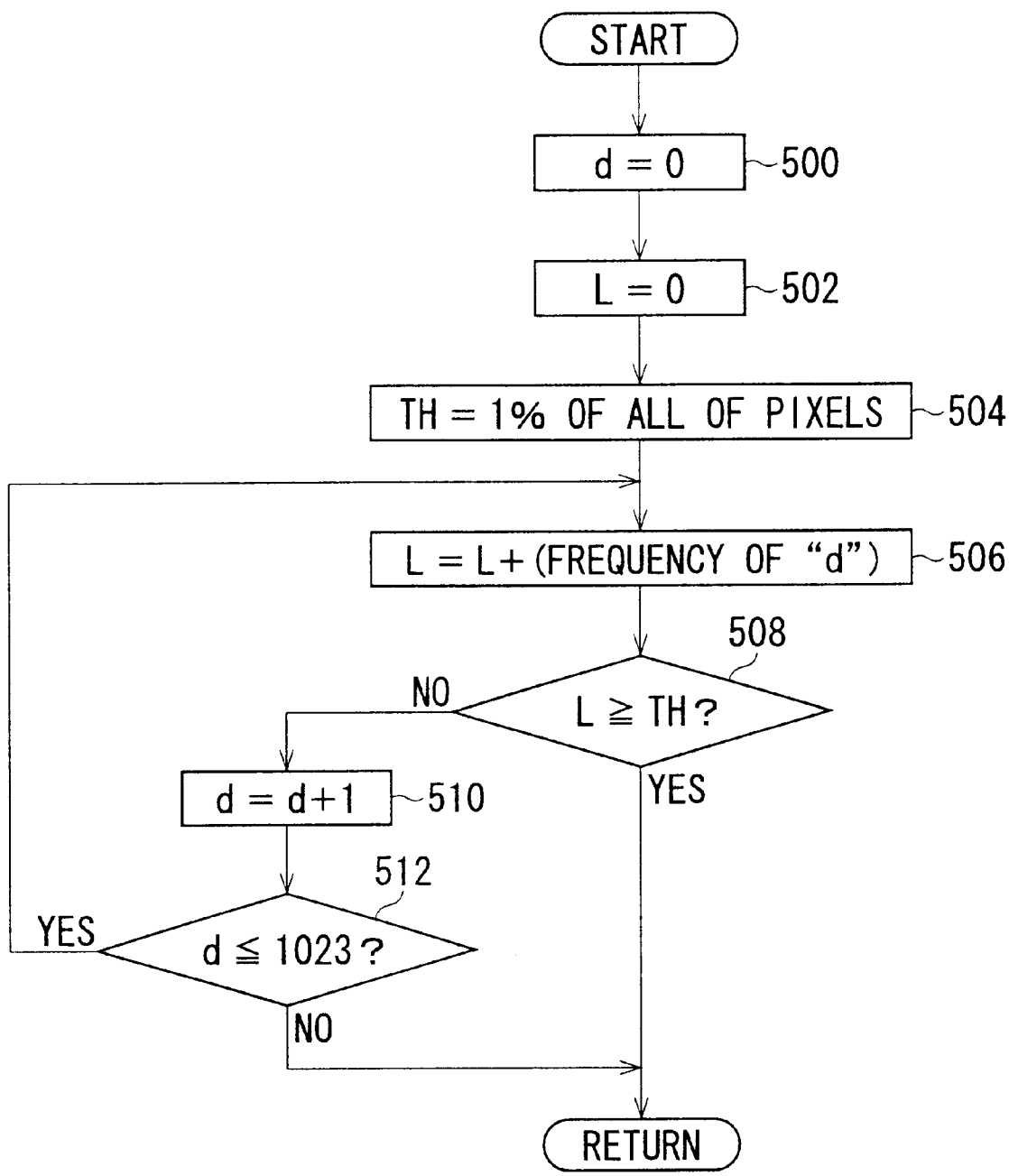
FIG. 10 shows a flowchart of a minimum effective value calculation routine executed in Step 140 of FIG. 3.

With reference to FIG. 10, a calculation to obtain the minimum effective value, performed in Step 140 of FIG. 3, is described. FIG. 10 shows a flowchart of a minimum effective value calculation routine. Although the contents of the flowchart are basically the same as those of the maximum effective value calculation routine shown in FIG. 6, the minimum effective value calculation routine is not executed for all of the histograms, but executed only for the first and second histograms which are obtained by the subroutine shown in FIG. 7.

In Step 500, a pixel value "d", which is the initial value of the minimum effective value, is set to "0". In Step 502, a total amount "L" of the frequencies is set to an initial value "0". In Step 504, the threshold value TH is set to be 1% of the total number of the digital pixel signals included in one frame. In Step 506, the frequency of the pixel value "d" is read from the memory 46, and is added to the total amount "L" of the frequencies which has been obtained so far, so that the total amount "L", of the frequencies from the minimum value "0" to the pixel value "d", is obtained.

In Step 508, it is determined whether the total amount "L" is greater than or equal to the threshold value TH. When the total amount "L" is less than the threshold value TH, the pixel value "d" is increased by 1 in Step 510. Then, in Step 512, it is determined whether the pixel value "d" is less than or equal to 1023. When the pixel value "d" is less than or equal to 1023, Step 506 is executed again, so that the total amount "L" of the frequencies, which are from the minimum value 0 to the pixel value "d", is obtained.

Thus, when it is determined in Step 508 that the total amount "L" is greater than or equal to the threshold value TH, the pixel value "d" is stored in the memory 46 as the minimum effective value, and this routine ends. Conversely, when it is determined in Step 512 that the pixel value "d" is greater than 1023, i.e., when the total amount "L", which exceeds the threshold value TH, does not exist, this routine ends.

The minimum effective values of the histograms Hr1, Hr2 and Hr3 are referred to as Hr1d, Hr2d and Hr3d, the minimum effective values of the histograms Hg1, Hg2 and Hg3 are referred to as Hg1d, Hg2d and Hg3d, and the minimum effective values of the histograms Hb1, Hb2 and Hb3 are referred to as Hb1d, Hb2d and Hb3d, hereinafter.

Each of the minimum effective values obtained as described above is modified in such a manner that the maximum effective value of the corresponding histogram is the above described predetermined value (e.g., 900). The modification is the same as the calculation of the optimum exposure time, which has been described with reference to FIGS. 8 and 9.

Namely, in the case of the R component, when the histogram Hr1 is selected as the first histogram in Step 120 of FIG. 3, the minimum effective value is calculated according to formula (4):

$$d=(PV/Hr1D) \times Hr1d \quad (4)$$

When the histogram Hr2 is selected as the first histogram, the minimum effective value is calculated according to formula (5), and when the histogram Hr3 is selected as the first histogram, the minimum effective value is calculated according to formula (6):

$$d=\{(PV-Hr1D) \times (Hr2d-Hr1d)\}/(Hr2D-Hr1D)+Hr1d \quad (5)$$

$$d=\{(PV-Hr2D) \times (Hr3d-Hr2d)\}/(Hr3D-Hr2D)+Hr2d \quad (6)$$

A calculation of the exposure parameter executed in Step 150 of FIG. 3 is described below.

Formula (7) is provided for processing a color correction and a negative/positive conversion, i.e., a linear-reversal gradation correction, to an output signal (i.e., a pixel value) of the line sensor 30. The normalized data obtained by the linear-reversal gradation correction are subjected to a correction such as a gamma correction by referring to a look-up-table (LUT) stored in the memory 46.

$$ND=L2-X2+L1=L2-(L1+(XV-d) \times (L2-L1)/(D-d))+L1 \quad (7)$$

wherein "ND" is the normalized data and "XV" is a pixel value.

In formula (7), "D" implies the maximum effective data, and "d" implies the minimum effective data. As described above with reference to FIG. 10, the minimum effective value "d" is determined in such a manner that the maximum effective value "D" is the predetermined value "900". Therefore, in the formula (7), the maximum effective value is the predetermined value "900". "L1" and "L2" are a lower standard value and an upper standard value of the LUT for performing various correction processes, including a gamma correction. Namely, the lower standard value L1 is the minimum value of the pixel values, which can be referred to in the LUT, and the upper standard value L2 is the maximum value of the pixel values, which can be referred to in the LUT.

Figure 11:
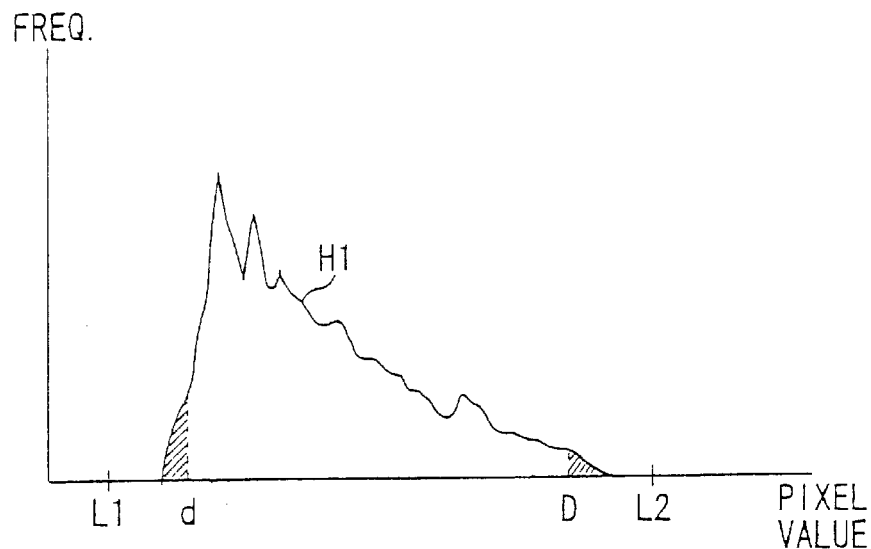
FIG. 11 is a representative histogram representing a distribution of pixel values obtained by a line sensor.

Therefore, in detail, pixel values (input values) of a histogram H1 shown in FIG. 11 are subjected to an offset subtraction calculation according to formula (8):

$$X1=(XV-d)+L1 \quad (8)$$

Namely, due to the term (XV-d), the minimum effective value "d" is subtracted from the pixel value "XV", so that the histogram H1, being hypothetically generated in the pre-scanning operation and the regular scanning operation to represent the range of pixel data of one frame-image, is shifted leftward in FIG. 11. By adding the lower standard value L1 to the shifted pixel value, an offset subtraction pixel value X1, and thus, a hypothetical histogram H2, as shown in FIG. 12, is obtained.

The substantial distribution breadth W1 of the histogram H2 ranges from L1 through (D−d)+L1, and is converted into the distribution breadth W2 according to formula (9):

$$X2=L1+(X1-L1)\times(L2-L1)/(D-d)=L1+((XV-d)+L1-L1)\times(L2-L1)/(D-d))=L1+(XV-d)\times(L2-L1)/(D-d) \quad (9)$$

Figure 12:
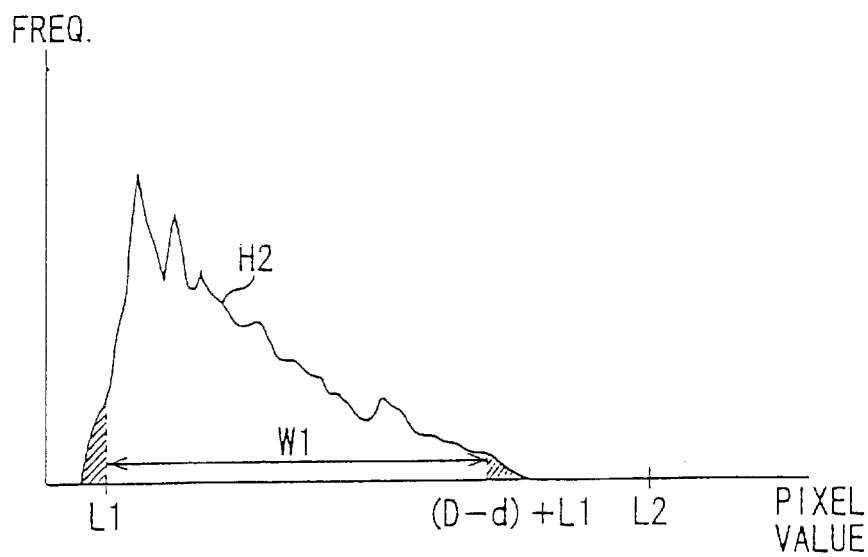
FIG. 12 is a hypothetical histogram obtained by performing an offset subtraction to the histogram shown in FIG. 11.
Figure 13:
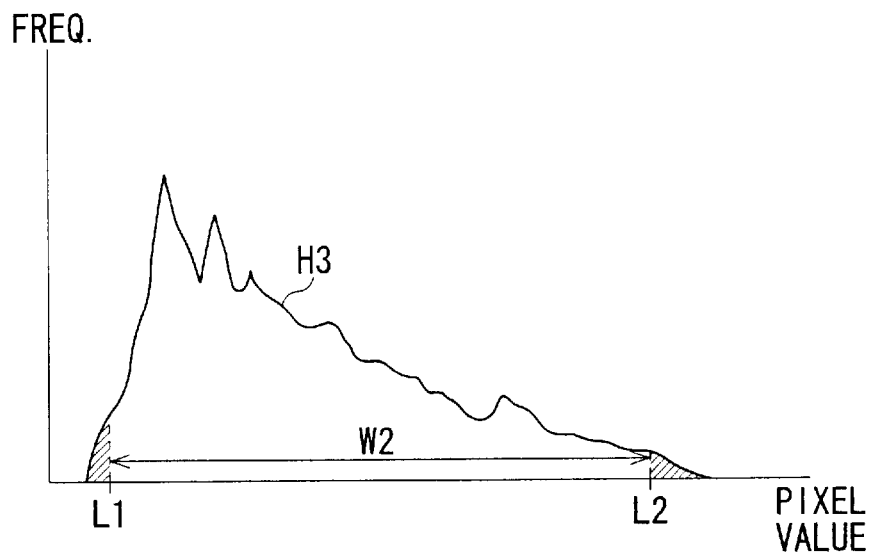
FIG. 13 is a hypothetical histogram obtained by multiplying the data of FIG. 12 by the coefficient (L2−L1)/(D−d)

Namely, by multiplying a value (X1−L1), which is obtained by subtracting the offset value L1 from the offset subtraction pixel value X1 of the histogram H2 of FIG. 12, by the coefficient (L2−L1)/(D−d), the distribution breadth W1 is expanded to the distribution breadth W2 as shown in FIG. 13. By adding the lower standard value L1 thereto, the histogram H3 shown in FIG. 13 is obtained.

Figure 14:
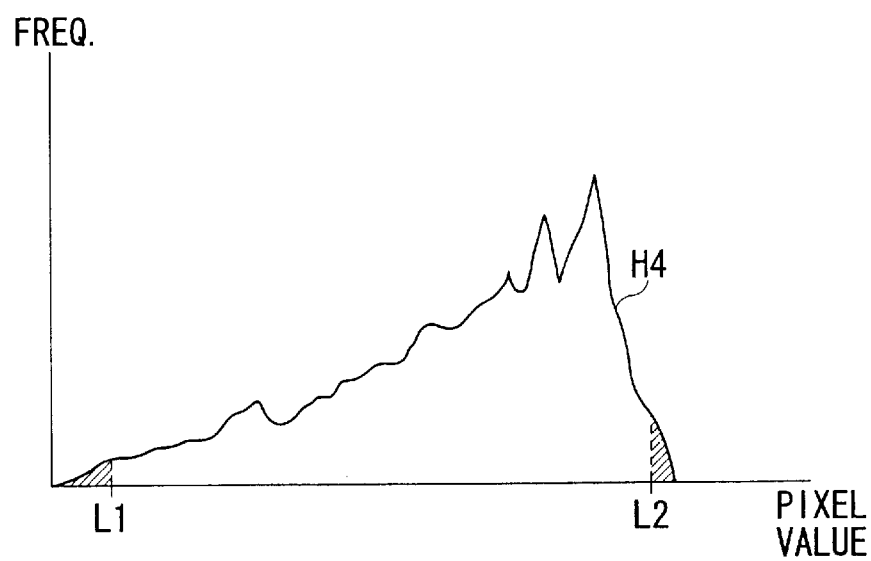
FIG. 14 is a hypothetical histogram of normalized data derived from the data of FIG. 13.

Then, by subtracting "X2" of formula (9) from the upper standard value L2 and adding the lower standard value L1 thereto (see formula (10)), the histogram H3 is left-right reversed. Namely, the image data of the one frame-image are subjected to the negative/positive conversion, so that a hypothetical histogram H4, corresponding to normalized digital pixel data, shown in FIG. 14 is obtained.

$$ND=L2+[(L2-L1)/(D-d)]\times d-[(L2-L1)/(D-d)]\times XV \quad (10)$$

Thus, each R, G and B component pixel data is converted in such a manner that a distribution range between the minimum effective value "d" and the maximum effective value "D" (e.g., 900) is changed to a distribution range between the upper standard value "L2" and the lower standard value "L1", so that the color balance of each of the color components can be adjusted. Thus, the image, read by the line sensor 30, can be reproduced with a natural color, which is the original color of the image. Namely, by adjusting the distribution range of each of the color components, the pixel data are color-adjusted.

Note that, in formula (10), "L2+[(L2−L1)/(D−d)]×d" is an offset value, and "(L2−L1)/(D−d)" is a coefficient, and the offset value and the coefficient are the exposure parameters. These exposure parameters are separately obtained for the R, G and B components.

The exposure parameters are used for performing the negative/positive conversion to the pixel values obtained by the pre-scanning operation or the regular scanning operation which are performed in Steps 160 or 180 of FIG. 3. The normalized data obtained according to formula (10) are subjected to a process such as a gamma correction by referring to the LUT, as described above, and transmitted to the display device of the computer 60, so that a color image is indicated on the surface of the display device.

Figure 15:
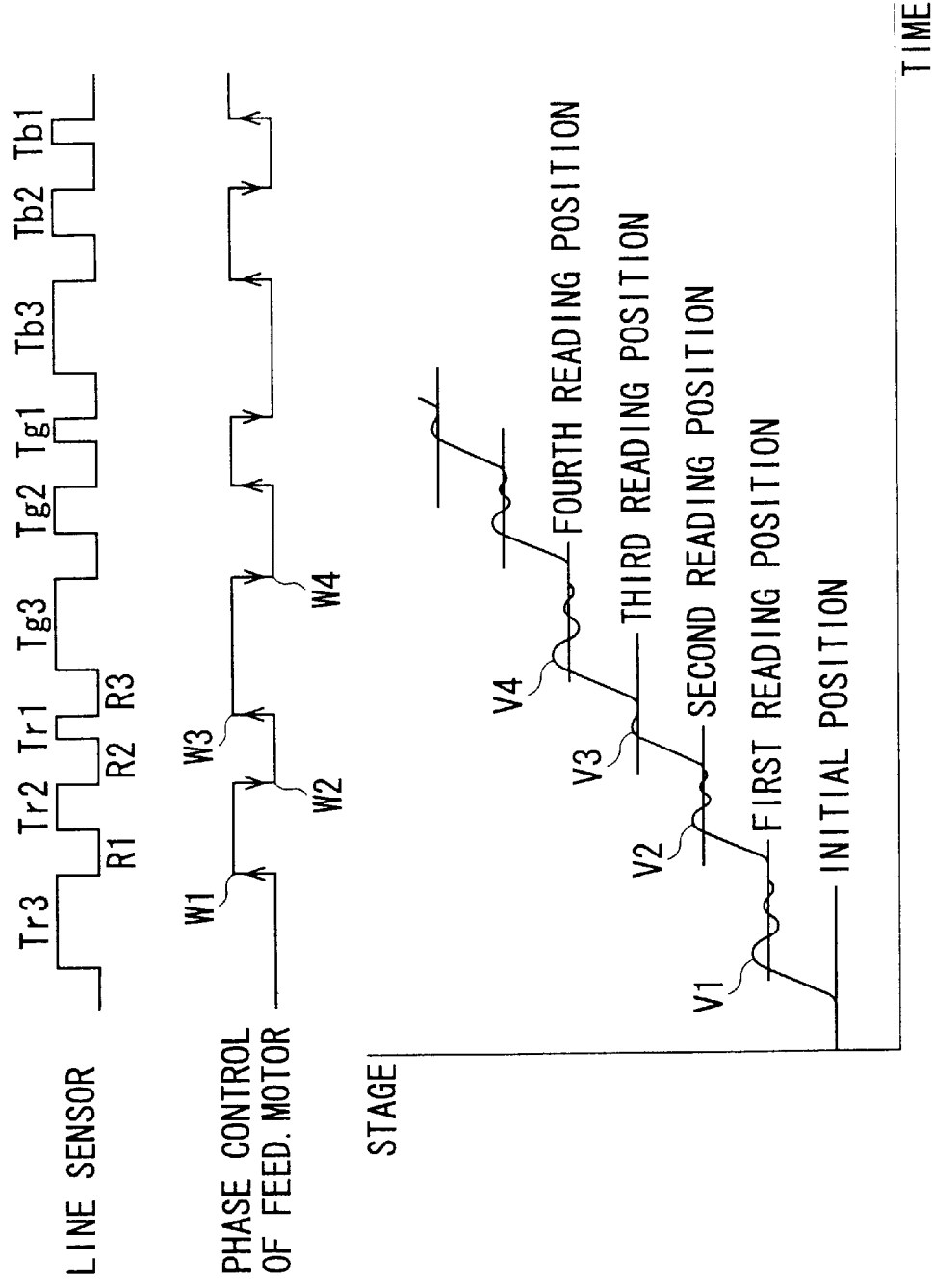
FIG. 15 is a timing chart showing an example of movements of a line sensor and a feeding motor in a coarse scanning operation, the example being different from the movement shown in FIGS. 5A and 5B.

FIG. 15 shows an example of movements of the line sensor 30 and the feeding motor (stepping motor) 15 in the coarse scanning operation, and the example being different from that shown in FIGS. 5A and 5B. As described above, the length of the exposure time to the line sensor 30 is set to three kinds for the R, G and B image data, respectively. Namely, regarding the R component, the first, second and third exposure times Tr1, Tr2 and Tr3 are set, regarding the G component, the first, second and third exposure times Tg1, Tg2 and Tg3 are set, and regarding the blue components, the first, second and third exposure times Tb1, Tb2 and Tb3 are set. In the embodiment, exposure operations are performed in order of length of the exposure times, i.e., an accumulation time of electric charge of the line sensor 30.

First, the stage 12 is located at an initial position, and the feeding motor 15 is stopped. The feeding motor 15 is driven by one pulse, and thus, the stage 12 is moved from the initial position to a first reading position. When the stage 12 reaches the first reading position, the line sensor 30 is exposed with the third exposure time Tr3, so that R component image data are sensed. During the exposure, a rotor of the feeding motor 15 is not stopped immediately because of the inertia of the rotor, and is vibrating (see reference V1). The amplitude of the vibration is small, and does not substantially affect the reading accuracy of the image data. The pulse rate of the drive pulse for moving the stage 12 from the initial position to the first reading position is small enough to start rotating from the stationary state.

While the rotor of the feeding motor 15 vibrates after the exposure operation, using the third exposure time Tr3, is completed, the pulse rate of the feeding motor 15 is changed to a value higher than the pulse rate used in the movement to the first reading position (see reference W1). Namely, the stage 12 is moved at a greater velocity to the second reading position. During the movement, a single line of the image data is read from the line sensor (see reference R1). When the stage 12 reaches the second reading position, the line sensor 30 is exposed with the second exposure time Tr2, and at this time, the rotor of the feeding motor 15 is vibrating slightly (see reference V2).

While the rotor of the feeding motor 15 vibrates after the exposure operation, using the second exposure time Tr2, is completed, the pulse rate of the feeding motor 15 is changed to a value higher than the pulse rate used in the movement to the second reading position (see reference W2), so that the stage 12 is moved at a greater velocity to the third reading position. During the movement, a single line of the image data is read from the line sensor (see reference R2). When the stage 12 reaches the third reading position, the line sensor 30 is exposed with the third exposure time Tr1, and at this time, the rotor of the feeding motor 15 is vibrating slightly (see reference V3).

Thus, when three lines of the R component image data have been sensed, the stage 12 is moved to a fourth reading position so that G component image data are sensed. At this time, the pulse rate of the feeding motor 15 is changed to a value higher than the pulse rate used in the movement from the second reading position to the third reading position (see reference W3). During the movement, a single line of the image data is read from the line sensor (see reference R3). When the stage 12 reaches the fourth reading position, the line sensor 30 is exposed with the third exposure time Tg3, and at this time, the rotor of the feeding motor 15 is vibrating slightly (see reference V4). However, the vibration is damped since the exposure time is relatively long, and thus, the amplitude of the vibration becomes approximately the same as that of the end of the reading operation at the first reading position. Therefore, when the exposure operation with the third exposure time Tg3 is completed, the pulse rate of the feeding motor 15 is changed to the same value as that of the movement from the first reading position to the second reading position (see reference W4).

Thus, the movements are repeated, so that the image data are sensed with changing exposure times, for each of the R, G and B components.

Figure 16:
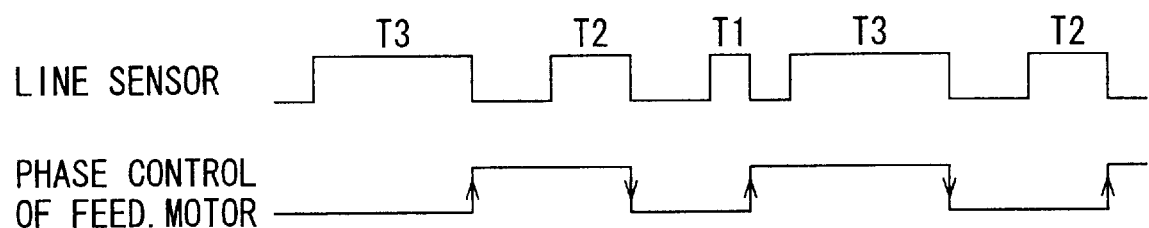
FIG. 16 is a timing chart showing another example of movements of the line sensor and the feeding motor in the coarse scanning operation.

FIG. 16 shows another example of the movements of the line sensor 30 and the feeding motor 15 in the coarse scanning operation. In this example, light emitting diodes radiating R, G and B light beams are not provided, but R, G and B components color filters are provided on a light receiving surface of the line sensor 30. Therefore, the exposure time is commonly used in each of the color components, and first, second and third exposure times T1, T2 and T3 are provided. A control of the drive pulse of the feeding motor 15 is the same as the example shown in FIG. 15. Note that the exposure time is controlled by an electronic shuttering operation to each of the photo-diodes provided in the line sensor 30.

According to the embodiment described above, the optimum exposure times Tr, Tg and Tb are determined in such a manner that the influences of the non-linearity of the output characteristics of the line sensor 30 become as small as possible. Accordingly, the exposure parameters, which are used for performing a color correction to the image data obtained by the line sensor 30, are set with a high accuracy, and thus, the colors of the reproduced image can become more natural than that obtained by a conventional device.

Further, in the embodiment, the exposure parameters can be obtained from the image data, which are obtained by a single coarse scanning operation, and therefore, the process time can be shortened in comparison with a conventional device.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 10-240711 (filed on Aug. 26, 1998) which is expressly incorporated herein, by reference, in its entirety.

What is claimed is:

1. An exposure control device provided in an image reading device which reads a color image recorded in a negative film, said exposure control device comprising:

an image reading processor that exposes an optical sensor to obtain image data corresponding to said color image, using more than two kinds of exposure times, which are different from each other, said image data being generated regarding said exposure times, respectively;

a histogram generating processor that generates histograms showing distributions of pixel values of said image data, regarding each of said exposure times;

a histogram selecting processor that obtains a maximum effective value in each of said histograms, and selects a first histogram, in which said maximum effective value does not exceed a predetermined value and is a greatest value among said histograms, and a second histogram corresponding to said image data obtained by using one of said exposure times which is subsequently shorter than said exposure time of said first histogram; and an optimum exposure time calculation processor that calculates an optimum exposure time based on said maximum effective values of said first and second histograms.

2. A device according to claim 1, wherein said image reading processor obtains said image data for colors different from each other, said histogram generating processor generates said histograms for each of said colors, said histogram generating processor selects said histograms for each of said colors, and said optimum exposure time calculation processor calculates said optimum exposure time for each of said colors.

3. A device according to claim 2, further comprising an exposure parameter calculating processor that calculates an exposure parameter by which a color correction is performed to said image data output from said optical sensor, based on said maximum effective value and a minimum effective value of each of said first and second histograms.

4. A device according to claim 1, wherein said optical sensor comprises a line sensor.

5. A device according to claim 1, wherein said image reading processor performs exposure operations in order of length of said exposure times, and moves one of said negative film and said optical sensor by a predetermined amount every time each of said exposure operations is completed.

6. A device according to claim 1, wherein said image reading processor exposes said optical sensor, using first, second and third exposure times, said second exposure time being twice said first exposure time, and said third exposure time being four times said first exposure time.

7. A device according to claim 1, wherein said maximum effective value comprises a pixel value which is less than a maximum value by said predetermined value.

8. A device according to claim 3, wherein said minimum effective value comprises a pixel value which is greater than a minimum value by said predetermined value.

9. A device according to claim 1, wherein said optimum exposure value is obtained by the following formula:

$$Tr=\{(CV-Hr1D)\times(Tr2-Tr1)\}/(Hr2D-Hr1D)+Tr1$$

wherein "Tr" is said optimum exposure value, "CV" is a constant value, "Hr2D" is said maximum effective value of said first histogram, "Hr1D" is said maximum effective value of said second histogram, "Tr2" is said exposure time for obtaining said first histogram, and "Tr1" is said exposure time for obtaining said second histogram.

10. An exposure control device provided in an image reading device which reads a color image recorded in a negative film, said exposure control device comprising:

an image reading processor that exposes an optical sensor to obtain image data corresponding to said color image, using first, second and third exposure times, which are different from each other, said image data being generated regarding said first, second and third exposure times, respectively;

a histogram generating processor that generates histograms showing distributions of pixel values of said image data, regarding said first, second and third exposure times;

a histogram selecting processor that obtains a maximum effective value in each of said histograms, and selects a first histogram, in which said maximum effective value does not exceed a predetermined value and is a greatest value among said histograms, and a second histogram corresponding to said image data obtained by using one of said exposure times which is shorter than that of said first histogram; and an optimum exposure time calculation processor that calculates an optimum exposure time based on said maximum effective values of said first and second histograms.

* * * * *